United States Patent
Avis et al.

(10) Patent No.: US 12,136,936 B2
(45) Date of Patent: Nov. 5, 2024

(54) MOBILE TACTICAL RADIO DEVICE, SYSTEM AND METHOD

(71) Applicant: Hughes Network Systems, LLC, Germantown, MD (US)

(72) Inventors: Graham Avis, San Diego, CA (US); Bill Whitmarsh, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 261 days.

(21) Appl. No.: 17/455,061

(22) Filed: Nov. 16, 2021

(65) Prior Publication Data

US 2023/0095660 A1 Mar. 30, 2023

Related U.S. Application Data

(60) Provisional application No. 63/247,858, filed on Sep. 24, 2021.

(51) Int. Cl.
*H04B 1/00* (2006.01)
*H04W 72/0453* (2023.01)
*H04W 88/02* (2009.01)

(52) U.S. Cl.
CPC ......... *H04B 1/0096* (2013.01); *H04B 1/0035* (2013.01); *H04B 1/006* (2013.01); *H04W 72/0453* (2013.01); *H04W 88/02* (2013.01)

(58) Field of Classification Search
CPC .... H04B 1/0096; H04B 1/0035; H04B 1/006; H04W 72/0453; H04W 88/02; H04W 84/06
See application file for complete search history.

(56) References Cited

U.S. PATENT DOCUMENTS

| | | | |
|---|---|---|---|
| 5,548,839 A * | 8/1996 | Caldwell | H03J 5/242 455/340 |
| 11,949,493 B2 * | 4/2024 | Atashbahar | H04B 7/18513 |
| 2005/0148361 A1 * | 7/2005 | Higuchi | H04M 1/725 455/552.1 |
| 2008/0144815 A1 | 6/2008 | Richards et al. | |

(Continued)

OTHER PUBLICATIONS

International Search Report and Written Opinion issued Sep. 21, 2022 in corresponding International Application No. PCT/US22/35556.

*Primary Examiner* — Angelica Perez

(74) *Attorney, Agent, or Firm* — Global IP Counselors, LLP

(57) ABSTRACT

Devices, systems and method for enabling radio communications between a plurality of users are disclosed herein. In an embodiment, a mobile tactical device includes a radio connection interface, a first frequency converter, a frequency filter, and a second frequency converter. The radio connection interface is configured to receive a first radio communication having a mobile frequency from a mobile radio. The first frequency converter is configured to convert the mobile frequency to an intermediate frequency. The frequency filter is configured to pass or reject the intermediate frequency. The second frequency converter is configured to convert the intermediate frequency to an assigned transmission frequency for transmission of the first communication when the intermediate frequency passes the at least one frequency filter.

20 Claims, 8 Drawing Sheets

(56) References Cited

U.S. PATENT DOCUMENTS

| | | | |
|---|---|---|---|
| 2008/0214134 A1* | 9/2008 | Shi | H04B 1/1036 455/295 |
| 2009/0180421 A1* | 7/2009 | Hall | H04B 7/18515 370/316 |
| 2009/0215411 A1* | 8/2009 | Tucker | H04W 76/45 455/90.2 |
| 2017/0026205 A1* | 1/2017 | Agee | H04W 28/14 |
| 2019/0103910 A1* | 4/2019 | Alford | H04B 7/15507 |

* cited by examiner

| Serial # | Type | Status | User Group | Talk Group | Beam | Sat Chan | Radio Chn | Last Update | Comments |
|---|---|---|---|---|---|---|---|---|---|
| 12345 | Maritime | Unassigned | customer1 | N/A | N/A | N/A | N/A | 2021-06-29 0914 UTC | Out for repair |
| 12346 | Backpack | Assigned | customer3 | Alpha1 | 56 | 721 | 156.05 | 2021-06-29 0921 UTC | |
| 12347 | Vehicular | Configured | customer3 | Alpha1 | 56 | 721 | 156.05 | 2021-06-29 1114 UTC | |
| 12347 | Vehicular | Configured | customer3 | AirWing | 56 | 416 | 162.475 | 2021-06-29 0214 UTC | |
| 12347 | Vehicular | Configured | customer3 | Charlie9 | 56 | 725 | 149.0375 | 2021-06-29 0935 UTC | |
| 12348 | Backpack | Configured | customer3 | Alpha1 | 56 | 721 | 156.05 | 2021-06-29 0914 UTC | |
| 12349 | Vehicular | Configured | customer3 | Alpha1 | 56 | 721 | 156.05 | 2021-06-29 2112 UTC | |
| 12350 | Maritime | Assigned | customer3 | Alpha1 | 56 | 721 | 156.05 | 2021-06-29 0914 UTC | |
| 12351 | Maritime | Unassigned | customer2 | N/A | N/A | N/A | N/A | 2021-06-29 1114 UTC | Location Unknown |
| 12352 | Backpack | Unassigned | customer2 | N/A | N/A | N/A | N/A | 2021-06-29 0214 UTC | |
| 12353 | Aero | Assigned | customer4 | Bravo5 | 128 | 564 | 467.725 | 2021-06-29 0935 UTC | |
| 12354 | Vehicular | Configured | customer4 | Bravo5 | 128 | 564 | 467.725 | 2021-06-29 0914 UTC | |
| 12355 | Backpack | Configured | customer4 | Bravo5 | 71 | 24 | 467.725 | 2021-06-29 2112 UTC | |
| 12356 | Maritime | Unassigned | customer5 | N/A | N/A | N/A | N/A | 2021-06-29 0914 UTC | |
| 12357 | Backpack | Unassigned | customer5 | N/A | N/A | N/A | N/A | 2021-06-29 0921 UTC | |
| 12358 | Backpack | Assigned | customer1 | Charlie9 | 56 | 161 | 149.0375 | 2021-06-29 1114 UTC | |
| 12359 | Backpack | Assigned | customer1 | Charlie9 | 99 | 225 | 149.0375 | 2021-06-29 0214 UTC | |
| 12360 | Maritime | Configured | customer1 | Charlie9 | 56 | 161 | 149.0375 | 2021-06-29 0935 UTC | |
| 12361 | Vehicular | Configured | customer1 | Charlie9 | 99 | 225 | 149.0375 | 2021-06-29 0914 UTC | |
| 12362 | Maritime | Configured | customer1 | Charlie9 | 99 | 225 | 149.0375 | 2021-06-29 2112 UTC | |
| 12363 | Aero | Configured | customer4 | AirWing | 201 | 334 | 162.475 | 2021-06-29 0514 UTC | |
| 12364 | Aero | Assigned | customer6 | Rescue1 | 151 | 436 | 446.01875 | 2021-06-29 0514 UTC | |
| 12365 | Maritime | Assigned | customer6 | Rescue1 | 151 | 436 | 446.01875 | 2021-06-29 0933 UTC | |

FIG. 5

MOBILE TACTICAL RADIO DEVICE, SYSTEM AND METHOD

PRIORITY

This application claims priority to U.S. Provisional Application No. 63/247,858, filed Sep. 24, 2021, entitled "Mobile Tactical Radio", the entire disclosure of which is incorporated herein by reference and relied upon.

BACKGROUND

Field of the Invention

The present disclosure generally relates to a mobile tactical radio device, system and/or method. In particular, the present disclosure relates to a mobile tactical radio device, system and/or method which enables a mobile radio to send and receive communications to and from multiple other mobile radios included in a talk group.

Background Information

A typical mobile satellite system (MSS) multiplexes many users onto a defined set of channels. Typically there is one assigned frequency channel for the forward link and a different assigned frequency channel for the return link. If the user of a mobile radio chooses the wrong frequency channel on the radio, they may also transmit on the wrong channel to the satellite.

SUMMARY

The present disclosure provides devices, systems and methods for enabling radio communications between a plurality of users. These devices, systems and methods enable selection of talk groups when communicating, for example, via satellite, high altitude platform station, and/or terrestrial microwaves. More specifically, these devices, systems and methods enable a user to communicate with a talk group using a mobile radio by selecting an assigned frequency and sending a short transmission using the assigned frequency. The devices, systems and methods also protect from unwanted in-band interference.

In view of the state of the known technology, one aspect of the present disclosure is to provide a mobile tactical device for enabling radio communications between a plurality of users. The mobile tactical device includes a radio connection interface, a first frequency converter, a frequency filter, and a second frequency converter. The radio connection interface is configured to receive a first radio communication having a mobile frequency from a mobile radio. The first frequency converter is configured to convert the mobile frequency to an intermediate frequency. The frequency filter is configured to pass or reject the intermediate frequency. The second frequency converter is configured to convert the intermediate frequency to an assigned transmission frequency for transmission of the first communication when the intermediate frequency passes the at least one frequency filter.

Another aspect of the present disclosure is to provide another mobile tactical device for enabling radio communications between a plurality of users. The mobile tactical device includes a radio connection, a frequency filter, a detector and a controller. The radio connection interface is configured to receive a first communication. The frequency filter is configured to pass or reject the first communication based on a frequency of the first communication. The detector is configured to enable detection that the first communication has passed the frequency filter. The controller is configured to cause the first communication to be converted to an assigned transmission frequency corresponding to an assigned mobile frequency upon determining that the first communication has passed the frequency filter based upon the detection by the detector.

Another aspect of the present disclosure is to provide a method of enabling radio communications between a plurality of users. The method includes receiving a momentary transmission from a mobile radio, converting a mobile frequency of the momentary transmission to an assigned transmission frequency using at least one frequency converter, and setting the at least one frequency converter such that a communication received using the assigned transmission frequency is converted to the mobile frequency for transmission to the mobile radio.

Also, other objects, features, aspects and advantages of the disclosed devices, systems and methods will become apparent to those skilled in the art in the field of mobile satellite systems and other communication systems from the following detailed description, which, taken in conjunction with the annexed drawings, discloses preferred embodiments of devices, systems and methods for enabling radio communications between a plurality of users with various features.

BRIEF DESCRIPTION OF THE DRAWINGS

Referring now to the attached drawings which form a part of this original disclosure:

FIG. 5 illustrates an example embodiment of a user interface at a network operation center which can be used to set up talk groups for multiple mobile tactical devices in accordance with the present disclosure;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
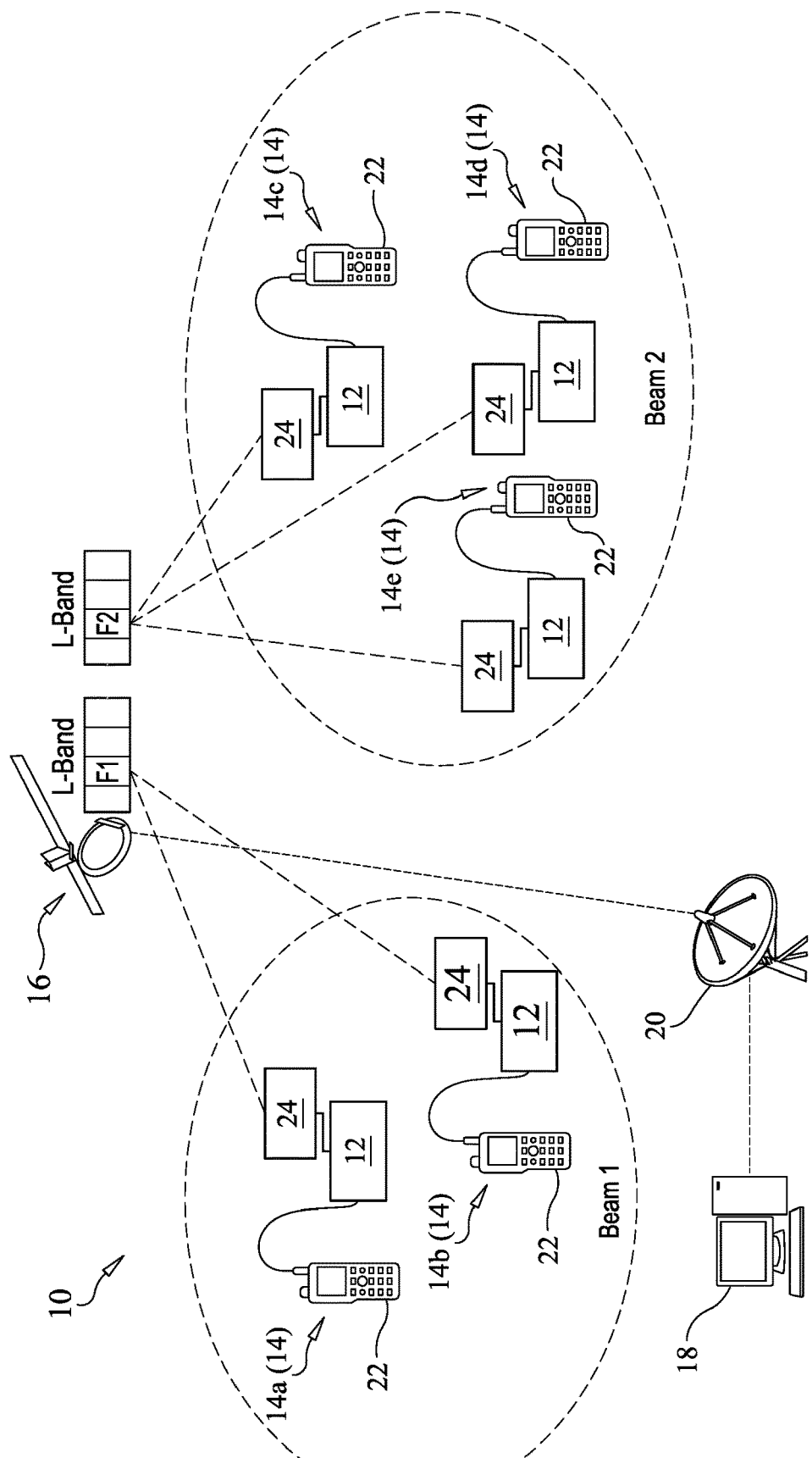
FIG. 1 illustrates an example embodiment of a system for enabling radio communications between a plurality of users in accordance with the present disclosure.

FIG. 1 illustrates an example embodiment of a system 10 for enabling radio communications between a plurality of users in accordance with the present disclosure. In the illustrated embodiment, the system 10 is an over-the-horizon system for tactical radio communications, for example, via an intermediate communication device (e.g., a mobile satellite or high altitude platform station) or terrestrial microwave. The system 10 includes and is enabled by at least one mobile tactical device 12. In the illustrated embodiment, the system 10 includes a plurality of mobile tactical devices 12. As explained in more detail below, each mobile tactical device 12 enables group communications from a first user to a plurality of second users, and vice versa, with the first user using the same mobile frequency for sent and received communications. Thus, a user can use a single mobile radio frequency to transmit a communication to a plurality of other users in the same talk group, and can receive communications back from the other users in the talk group using the same mobile radio frequency. In another embodiment, the mobile radio frequency can be the same or a different (duplex paired) frequency for reception.

In the illustrated embodiment, the system 10 includes a plurality of radio units 14. In FIG. 1, the plurality of radio units 14 include a first radio unit 14a operated by a first user, a second radio unit 14b operated by a second user, a third radio 14c unit operated by a third user, a fourth radio unit 14d operated by a fourth user, and a fifth radio unit 14e operated by a fifth user. In FIG. 1, the first radio unit 14a and the second radio unit 14b are located in Beam 1 of the satellite 16 and communicate with the satellite 16 using a first transmission frequency F1, while the third radio 14c, the fourth radio unit 14d, and the fifth radio unit 15e are located in Beam 2 of the satellite 16 and communicate with the satellite 16 using a second transmission frequency F2. As described in more detail below, any combination of the radio units 14 can be assigned to a talk group such that any one of the radio units 14 can send and receive communications with the rest of the radio units 14 in the same talk group using the same mobile frequency for sent and received communications. For example, when all of the radio units in FIG. 1 are assigned to the same talk group, any one of the radio units 14 can send a single communication to all of the other radio units 14 at once, and can receive a response at the same mobile frequency that the single communication was sent at. In another embodiment, the mobile radio frequency can be the same or a different (duplex paired) frequency for reception. The system 10 is advantageous, for example, when a tactical mission is taking place in Beam 2 and one or more radio unit 14 in Beam 1 wishes to communicate with multiple radio units 14 in Beam 2.

In the illustrated embodiment, the system 10 includes an intermediate communication device. In the illustrated embodiment, the intermediate communication device includes at least one satellite 16. In a more complex embodiment, the system 10 includes a plurality of satellites 16, which enables more radio units 14 to be included in talk groups and communicate as discussed herein. In alternative embodiments, the intermediate communication device can include high altitude platform station or the mobile tactical devices 12 can communicate via terrestrial microwaves. The satellite 16 communicates with the radio units 14 over a radio frequency link, such as an L-band link, an S-band link, or any other suitable type of link as understood in the art. In FIG. 1, the satellite 16 enables communication between the radio units 14 over a plurality of transmission frequencies (including the first transmission frequency F1, the second transmission frequency F2, etc.), as discussed in more detail below. The beams (e.g., Beam 1, Beam 2, etc.) are propagated from the satellite 16. As will be understood by those of ordinary skill in the art from this disclosure, each satellite 16 in a satellite communication network propagates at least one beam onto a specific region of the earth. The beam defines a coverage area for the satellite 16. Thus an antenna or satellite dish located within the beam is enabled for satellite communications via the satellite 16 propagating the beam.

In the illustrated embodiment, the system 10 includes a network operation center 18. The network operation center 18 includes a database coordinating with operators of the system 10 to coordinate the mobile frequencies and/or transmission frequencies used by the system 10 for sent and return communications within a talk group. The network operation center 18 is configured to be placed in communication with a mobile tactical device 12 to set up talk groups in accordance with the present disclosure. Specifically, the network operation center 18 configures the mobile frequencies and/or transmission frequencies of each mobile tactical device 12 to set up the talk groups. In an embodiment, the network operation center 18 also supports manual configuration of the mobile tactical devices 12 of the system 10 when a secure link is not available to the field location. The configuring performed at the network operation center 18 is discussed in more detail below. In an embodiment, there can be more than one network operation center 18 operating as part of the system 10. The network operation center 18 can include, for example, commercial class Linux servers, dual server redundancy, active redundant databases, and other computer components known to those of ordinary skill in the art. The network operation center can also include one or more local computer (e.g. computer 80 discussed herein) for local configuring of the mobile tactical device 12 as discussed in more detail below.

In the illustrated embodiment, the system 10 includes a gateway 20. The gateway 20 enables an entity to monitor and/or control certain satellite transmissions. In an embodiment, the gateway 20 communicates with the satellite 16 via a feeder link. In an embodiment, the network operation center 18 communicates with the satellite 16 and thus the mobile tactical devices 12 via the gateway 20. In an embodiment, the system 10 can operate without a gateway 20.

In FIG. 1, each radio unit 14 includes a mobile tactical device 12, a mobile radio 22 and an antenna 24. The mobile radio 22 can be a UHF, VHF or other type of mobile radio configured to send and/or receive communications using one or more mobile frequency. An advantage of the mobile tactical device 12 disclosed herein is that various types of mobile radios 22 can be connected to the mobile tactical device 12 and used in talk groups in accordance with the present disclosure. For example, the system 10 enables UHF, VHF and other types of radios to be compatible and communicate with each other over the horizon. The mobile tactical device 12 used for each radio unit 14 is configured to convert a mobile frequency used by a mobile radio 22 for sent communications to a transmission frequency for transmission to the satellite 16, and likewise to convert the transmission frequency to the mobile frequency used by the mobile radio 22 for received communications. In this way, the mobile tactical device 12 enables a single mobile frequency to be used to send and receive satellite communications to and from multiple mobile radios 22 included in a talk group. As used herein, the "mobile frequency" refers to the frequency dialed up and used by the mobile radio 22 for communications, while the "transmission frequency" refers to the frequency used to transmit outgoing communications from the mobile tactical device 12 to other members of the talk group and receive incoming communications to the mobile tactical device 12 from other members of the talk group (e.g., to transmit communications to the satellite 16 and receive communications from the satellite 16). In an embodiment, the mobile frequency is in a VHF or UHF frequency range. In an embodiment, the transmission frequency is in an L-band or S-band frequency range.

The antenna 24 is configured to send and/or receive communications to or from the satellite 16. More specifically, the antenna 24 is configured to communicate with the satellite 16 using transmission frequencies. The antenna 24 can be an active antenna or a passive antenna. The type of antenna 24 will vary depending on how the mobile tactical device 12 is used in the field. An advantage of the mobile tactical device 12 disclosed herein is that it may be connected to different types of mobile radios 22 and antennas 24 and used in a wide variety of scenarios such as personal/backpack, vehicular, maritime, or aero uses. The antenna can be an existing antenna known to those of ordinary skill in the art. With the mobile tactical device 12 described herein, a user can use whichever antenna 24 is most advantageous for specific circumstances without having to use a different mobile tactical device 12. Alternatively, minor modifications can be made to mobile tactical devices 12 for different applications and/or different antennas 24.

Figure 2:
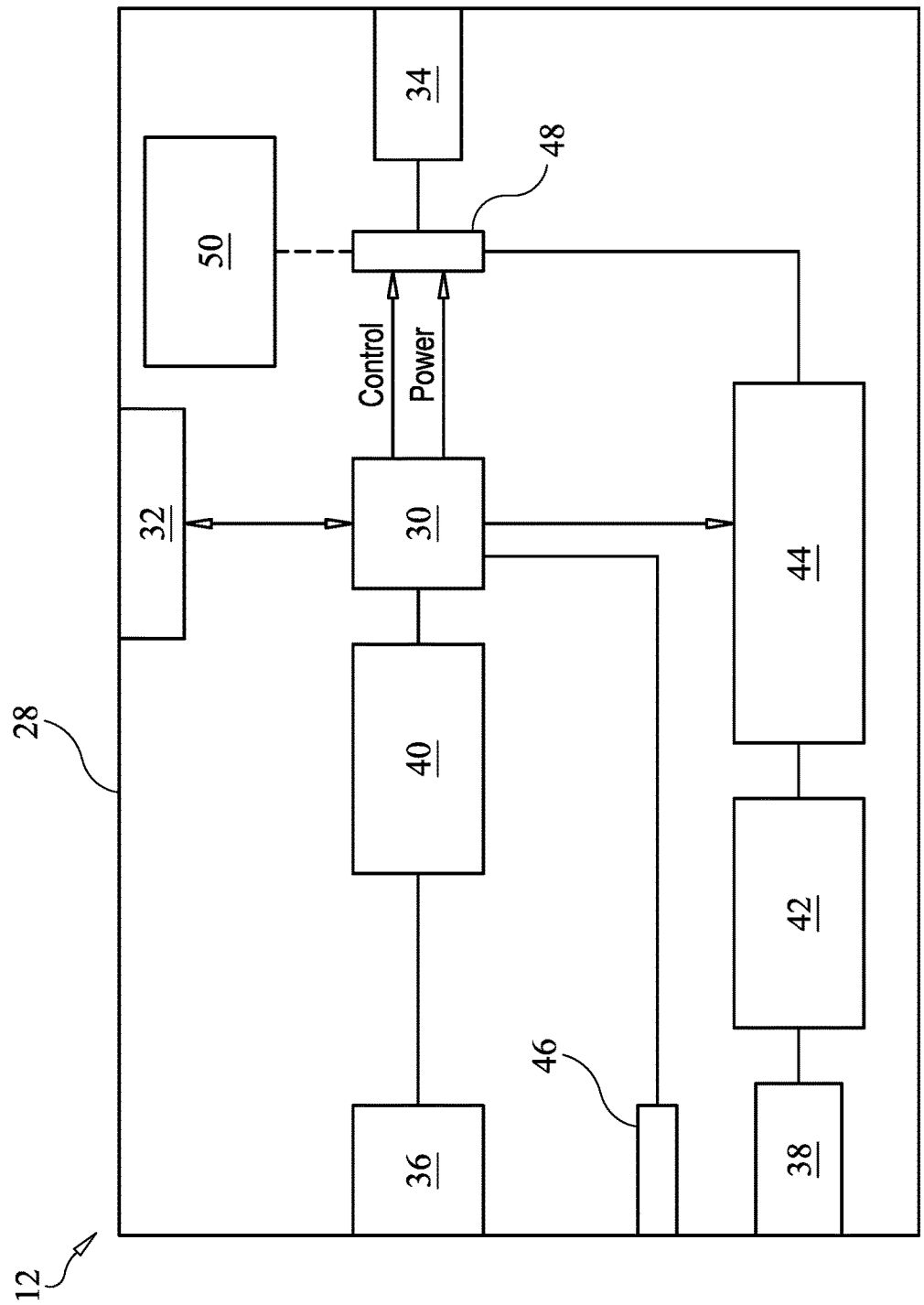
FIG. 2 illustrates a schematic diagram of an example embodiment of the components of a mobile tactical device in accordance with the present disclosure.

FIG. 2 illustrates an example schematic diagram of a mobile tactical device 12. In the illustrated embodiment, the mobile tactical device 12 includes a housing 28. The housing 28 can be made of any suitable material to protect the components therein. The material may vary, for example, based on the intended application of the mobile tactical device 12. As illustrated for example in FIGS. 2, 4 and 6, the housing 12 can be a fairly simple structure (e.g., a box-shaped structure). One advantage of the present disclosure is that the mobile tactical device 12 does not require a complicated housing or user interface to enable or adjust talk group communications as discussed herein.

The mobile tactical device 12 includes a controller 30. As understood in the art, the controller 30 preferably includes a microcomputer with a control program that controls the other components as discussed herein. The controller 30 can also include other conventional components such as an input interface circuit, an output interface circuit, and storage devices such as a ROM (Read Only Memory) device and a RAM (Random Access Memory) device. The RAM and ROM store processing results and control programs that are run by the controller 30. The controller 30 is operatively coupled to the other components of the mobile tactical device 12 as appropriate, in a conventional manner. It will be apparent to those skilled in the art from this disclosure that the precise structure and algorithms for the controller 30 can be any combination of hardware and software that will carry out the functions of the present disclosure.

The mobile tactical device 12 includes one or more connection interfaces. For example, in the illustrated embodiment, the mobile tactical device 12 includes a control connection interface 32, an antenna connection interface 34, a power connection interface 36 and/or a radio connection interface 38. The control connection interface 32 is configured to enable connection to a user interface to allow a user to locally program the controller 30 of the mobile tactical device 12. In an embodiment, the mobile tactical device 12 can be designed with an integral user interface, however, the illustrated embodiment is designed as a simple unit without a user interface. The antenna connection interface 34 is configured to enable connection to an antenna 36. In an embodiment, the mobile tactical device 12 can include an internal antenna instead of or in addition to the antenna 24 being connected at the antenna connection interface 34. The power connection interface 36 is configured to enable connection to a power supply such as a battery. In an embodiment, the mobile tactical device 12 can include an internal power supply instead of or in addition to the power supply being connected at the power connection interface 36. The radio connection interface 38 is configured to enable connection to a mobile radio 22. In use, the radio connection interface 38 is configured to receive one or more communications at one or more mobile frequencies from the mobile radio 22. The connections can be wired or wireless. In an embodiment, each connection interface provides a port for the respective connection to be made. Thus, in an embodiment, the housing 28 can be a simple structure with only ports for various connection interfaces.

In the illustrated embodiment, the mobile tactical device 12 includes a voltage regulator 40. The voltage regulator 40 can be a standard voltage regulator as known in the art which is configured to ensure a steady voltage supply from a power source connected to the power connection interface 36.

In the illustrated embodiment, the mobile tactical device 12 includes a frequency detector 42 and a frequency converter 44. The frequency detector 42 is configured to detect the current mobile frequency (e.g., UHF, VHF) of the mobile radio 22 which is connected to the radio connection interface 38. The frequency converter 44 is configured to convert the mobile frequency selected at the mobile radio 22 into a transmission frequency (e.g., L-band, S-band, etc.) for communication with the satellite 16. The frequency converter 44 is also configured to convert the transmission frequency of a communication received from the satellite 16 back to the selected mobile frequency of the mobile radio 22. An example embodiment of the frequency conversion at the frequency converter 44 is discussed in more detail below with respect to FIG. 3.

In various embodiments, the mobile tactical device 12 can further include one or more light (e.g., LED) 46, one or more coupler 48, and/or one or more additional power source 50. The one or more light 46 can be used to indicate a status of the mobile tactical device 12, for example, when the mobile tactical device 12 has established a secure connection with the network operating center 18 for configuration. The one or more coupler 48 is configured to couple the frequency converter 44 to the antenna connection interface 34 and/or to connect the additional power source 50 to one or more other components of the mobile tactical device 12. The additional power source 50 can be used instead of and/or in addition to the power supplied at the power connection interface 36.

The mobile tactical device 12 is configured to select a receiving channel for the mobile radio 22 connected to the radio RF connection interface 38 based on a transmission channel used by the mobile radio 22. More specifically, as described in more detail below, when the user of the mobile radio 22 sends a momentary transmission using an assigned mobile frequency, the mobile tactical device 12 sets the active channel at that same assigned mobile frequency. In this way, the user simply needs to select an assigned mobile frequency using the mobile radio 22 connected to the radio RF connection interface 38 to configure the radio unit 14 for transmission and reception of communications for a specific talk group.

Figure 3:
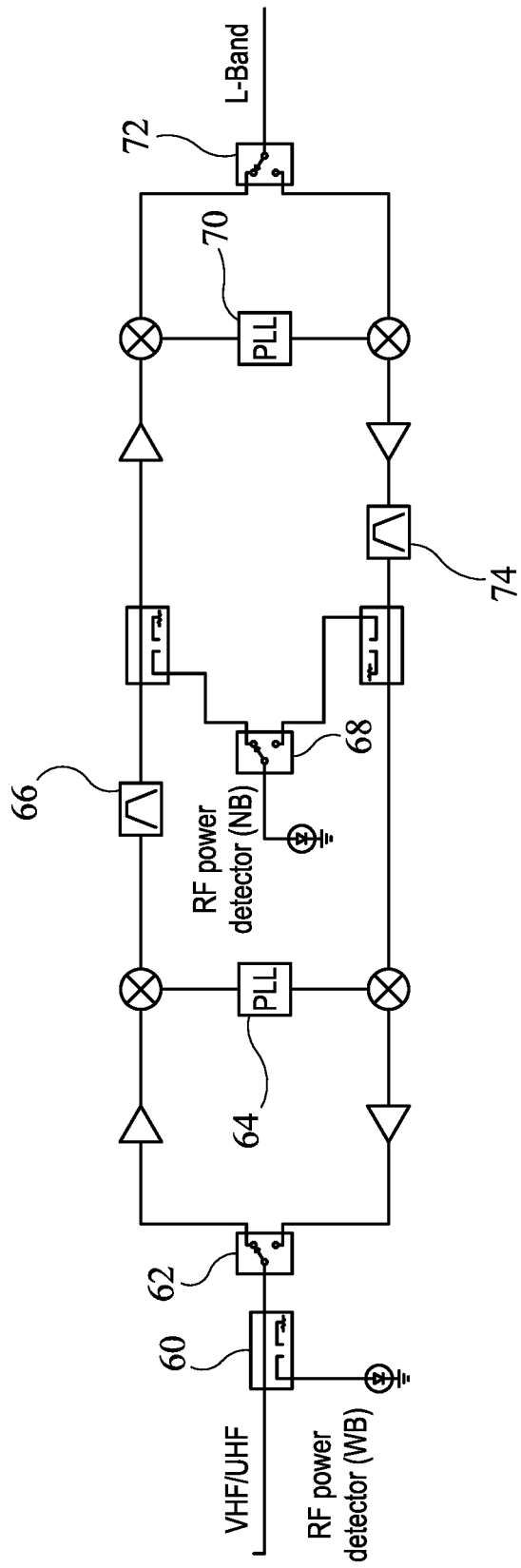
FIG. 3 illustrates a schematic diagram of an example embodiment of the circuitry of a mobile tactical device in accordance with the present disclosure.

FIG. 3 illustrates an example embodiment of a high level block diagram of the operation at the mobile tactical device 12. More specifically, FIG. 3 illustrates an example embodiment high level block diagram of the operation at the frequency detector 42 and/or the frequency converter 44 in FIG. 2. In an embodiment, the controller 30 is configured to adjust and/or control one or more components shown in FIG. 3 based on a configuration file received from a network operation center 18 (e.g., remotely or via a local computer 80).

In the illustrated embodiment of FIG. 3, the mobile tactical device 12 includes a first RF power detector 60, a first switch 62, a first frequency converter 64, an uplink frequency filter 66, a second RF power detector 68, a second frequency converter 70, a second switch 72, and a downlink frequency filter 74. These components are configured to be adjusted and/or controlled by the controller 30. More specifically, as explained in more detail below, the controller 30 is configured to cause a communication from the mobile radio 22 to be converted to an assigned transmission frequency corresponding to an assigned mobile frequency upon determining that the communication has passed the uplink frequency filter 66 based upon the detection by the first RF power detector 60 and/or the second RF power detector 68. Those of ordinary skill in the art will recognize from this disclosure that a mobile tactical device 12 according to the present disclosure can have more or less components and can be configured differently.

In FIG. 3, the mobile frequency (e.g., VHF/UHF) at the first switch 62 and the transmission frequency (e.g., L-band) at the second switch 72 are arbitrary frequencies/channels. The mobile tactical device 12 is configured to use software controlled mapping of input to output frequencies. In the illustrated embodiment, an uplink communication signal from the mobile radio 22 to the antenna 24 passes through the first RF power detector 60, the first switch 62, the first frequency converter 64, the uplink frequency filter 66, the second. RF power detector 68, the second frequency converter 70, and the second switch 72. A downlink communication signal from the antenna 24 to the mobile radio 22 passes through the second switch 72, the second frequency converter 70, the downlink frequency filter 74, the second RF power detector 68, the first frequency converter 64, the first switch 62, and the first RF power detector 60. Although FIG. 3 illustrates a half-duplex system, the frequency converter 44 can also be configured as a full duplex system.

The first RF power detector 60 is configured to detect power from a communication using a mobile frequency at the mobile radio 22. Specifically, the first RF power detector 60 is configured to detect power related to the mobile frequency from an uplink signal prior to the uplink frequency filter 66. The first RF power detector 60 is also configured to detect power related to the mobile frequency from the uplink signal prior to the first frequency converter 64. In the illustrated embodiment, the first RF power detector 60 plays no role in the downlink signal direction. In an embodiment, the first RF power detector 60 includes a wideband power detector.

The first switch 62 is configured to enable bi-directional communication at the mobile radio 22 using the mobile frequency channel selected by the user of the mobile radio 22. More specifically, the first switch 62 is configured to enable the mobile radio 22 to send and/or receive communications using the mobile frequency channel selected by the user of the mobile radio 22.

The first frequency converter 64 is configured to convert the mobile frequency sent by the mobile radio 22. More specifically, the first frequency converter 64 is configured to convert the mobile frequency sent by the mobile radio 22 to an intermediate frequency. In the illustrated embodiment, the first frequency converter 64 includes a downconverter which downconverts the mobile frequency to the intermediate frequency. In an alternative embodiment, first frequency converter 64 can include an upconverter which upconverts the mobile frequency to the intermediate frequency. In the illustrated embodiment, the first frequency converter 64 is a phase-locked loop (PLL) frequency converter. Thus, the input mobile frequency and/or output mobile frequency on the uplink side is stored such that when the output intermediate frequency on the uplink side is received as an input frequency on the downlink side for a received communication, the first frequency converter 64 converts the received communication back to the input mobile frequency initially received on the uplink side. This ensures that the mobile frequency sent by the mobile radio 22 is the same as the mobile frequency received by the mobile radio 22. In an embodiment, the first frequency converter 64 includes a duplex frequency pair.

The uplink frequency filter 66 is configured to filter the uplink signal transmitted by the mobile radio 22. More specifically, the uplink frequency filter 66 is configured to pass or reject the intermediate frequency of the sent communication. The uplink frequency filter 66 is configured to pass the intermediate frequency when the intermediate frequency is a predetermined frequency. The uplink frequency filter 66 is configured to reject (not pass) the intermediate frequency when the intermediate frequency is not the predetermined frequency. In this way, the uplink frequency filter 66 prevents unwanted transmissions to the satellite 16. The uplink frequency filter 66 thus ensures that interference with other signals using the satellite uplink cannot occur by mistake.

The second RF power detector 68 is configured to detect power from the intermediate frequency. In the illustrated embodiment, the second RF power detector 68 detects power on the uplink side of the circuit between the uplink frequency filter 66 and the second frequency converter 70. Thus, the second RF power detector 68 is configured to detect power related to the intermediate frequency from the uplink signal after the uplink frequency filter 66. In this way, the second RF power detector 68 enables detection that the intermediate frequency has passed the uplink frequency filter 66. The second RF power detector 68 is also configured to detect power related to the intermediate frequency from the uplink signal prior to the second frequency converter 70. In the illustrated embodiment, the second RF power detector 68 also detects power on the downlink side of the circuit between the downlink frequency filter 74 and the first frequency converter 64. Thus, the second RF power detector 68 is configured to detect power related to an intermediate frequency of a downlink signal after conversion by the second frequency converter 70. The second RF power detector 68 is also configured to detect power related to the intermediate frequency of a downlink signal after the downlink frequency filter 74 filters the signal. In an embodiment, the second RF power detector 68 includes a narrowband power detector.

The controller 30 is configured to use readings from the first RF power detector 60 and the second RF power detector 68 to determine whether a communication has passed the uplink frequency filter 66. If power is detected at the first RF power detector 60 but not the second RF power detector 68, the controller 30 is configured to determine that a sent communication from the mobile radio 22 has not passed the uplink frequency filter 66. If power is detected at the both the first RF power detector 60 and the second RF power detector 68, the controller 30 is configured to determine that a sent communication from the mobile radio 22 has passed through the uplink frequency filter 66. The controller 30 is thus configured determine that the mobile frequency has passed the uplink frequency filter 66 by comparing detections at the first RF power detector 60 and the second RF power detector 68.

Thus, the controller 30 is configured to use readings from the first RF power detector 60 and the second RF power detector 68 to determine whether a communication has been sent in an assigned mobile frequency. In this illustrated embodiment, the controller 30 controls the frequency conversion at the first frequency converter 64 based on one or more assigned mobile frequency. More specifically, the controller 30 controls the first frequency converter 64 to convert the mobile frequency to the intermediate frequency using the appropriate conversion parameters for an assigned mobile frequency. If the resulting converted intermediate frequency does not pass the uplink frequency filter 66, then the mobile frequency did not correspond to the assigned mobile frequency used to determine the appropriate conversion parameters.

When there are multiple assigned frequencies, as explained in more detail below, the controller 30 is configured to control the first frequency converter 64 to convert, the mobile frequency of the sent communication to the intermediate frequency using the appropriate conversion parameters for each of the assigned mobile frequencies (e.g., which can be cycled through quickly by the controller 30/first frequency converter). When the converted intermediate frequency does not pass the uplink frequency filter 66, this means that the mobile frequency does not correspond to the assigned mobile frequency used to determine the conversion parameters. When the converted intermediate frequency passes the uplink frequency filter 66, this means that the mobile frequency corresponds to the assigned mobile frequency used to determine the conversion parameters, and the controller 30 therefore determines which of a plurality of assigned mobile frequencies has been selected at the mobile radio 22. In this way, the mobile tactical device 12 is configured to reject mobile frequencies that are not assigned mobile frequencies, while also enabling the controller 30 to determine which of a plurality of assigned mobile frequencies corresponds to a selected mobile frequency when the user has properly selected an assigned mobile frequency at the mobile radio 22.

The second frequency converter 70 is configured to convert the intermediate frequency of the communication sent by the mobile radio 22. More specifically, on the uplink side, the second frequency converter 70 converts the intermediate frequency to an assigned transmission frequency for the communication to be sent (e.g., to the satellite 16). The controller 30 is configured to select the assigned transmission frequency corresponding to the assigned mobile frequency, and control the second frequency converter 70 to convert the intermediate frequency to the assigned transmission frequency. On the downlink side, the second frequency converter 70 converts an assigned transmission frequency of a communication received (e.g., from a satellite 16) to the intermediate frequency to be transmitted to the mobile radio 22. Thus, the second frequency converter 70 is configured to convert a frequency of the communication to an assigned transmission frequency for transmission (e.g., to the satellite 16) if the frequency passes the uplink frequency filter 66, and to convert the assigned transmission frequency of another communication received (e.g., from the satellite 16) to the same frequency.

In an embodiment, the second frequency converter 70 is a frequency synthesizer. In the illustrated embodiment, the frequency synthesizer 70 is a phase-locked loop (PLL) frequency synthesizer. Thus, the input intermediate frequency and/or output transmission frequency on the uplink side is stored, such that when the output transmission frequency on the uplink side is received as an input transmission frequency on the downlink side for a received communication from the satellite 16, the second frequency converter 70 converts the received communication back to the input intermediate frequency initially received on the uplink side. This ensures that the intermediate frequency received by the second frequency converter 70 on the uplink side is the same as the frequency output the second frequency converter 70 on the downlink side.

The second switch 72 is configured to enable bi-directional communication over the radio frequency link used by the antenna 24 and satellite 16. More specifically, the second switch 72 is configured to enable the antenna 24 and satellite 16 to send and/or receive communications over the radio frequency link.

The downlink frequency filter 74 is configured to filter the intermediate signal output by the second frequency filter 70. The downlink frequency filter 74 is configured to pass the intermediate frequency when the intermediate frequency is a predetermined frequency. The downlink frequency filter 74 is configured to reject (not pass) the intermediate frequency when the intermediate frequency is not the predetermined frequency. In this way, the downlink frequency filter 74 prevents unwanted transmissions from the satellite 16 to the mobile radio 22.

When the mobile radio 22 is tuned to a particular mobile frequency and transmits a communication in that mobile frequency, the first RF power detector 60 measures power from the uplink signal. The first switch 62 directs the signal to the uplink side of the circuit. The frequency converter 64 converts (e.g., downconverts) the mobile frequency to an intermediate frequency. In an embodiment in which the mobile tactical device 12 is configured for multiple talk groups, the frequency converter 64 converts the mobile frequency to the intermediate frequency assuming that the mobile frequency is a first assigned mobile frequency. The uplink frequency filter 66 passes the intermediate frequency if the intermediate frequency is a predetermined frequency. The second RF power detector 68 measures power after the uplink frequency filter 66. If the first RF power detector 60 has measured power and the second RF power detector 68 has not measured power, this indicates that the intermediate frequency has not passed through the uplink frequency filter 66. If the mobile tactical device is configured for multiple talk groups, then the controller 30 then causes the frequency converter 64 to convert the mobile frequency to the intermediate frequency assuming that the mobile frequency is a second assigned mobile frequency. If no conversion results in the uplink signal passing the uplink frequency filter 66, then the user has not chosen an assigned mobile frequency at the mobile radio 22. If a particular conversion results in the uplink signal passing the uplink frequency filter 66, then the controller 30 is configured to determine which of a plurality of assigned mobile frequencies has been chosen at the mobile radio 22 based on the corresponding conversion used.

If the first RF power detector 60 and the second RF power detector 68 have both measured power, this indicates that an assigned mobile frequency has been chosen at the mobile radio 22 and recognized by the controller 30, and that the signal has passed through the uplink frequency filter 66, The second frequency filter 70 then converts the assigned mobile frequency to the corresponding assigned transmission frequency for transmission (e.g., to the satellite 16). The second switch 72 then directs the uplink signal to the antenna 24 and the communication is transmitted (e.g., to the satellite 16) using the assigned transmission frequency to be sent to other members of the appropriate talk group according to the transmission parameters for those respective mobile tactical device 12.

When a communication is received from the antenna 24, the second switch 72 directs the communication to the downlink side of the circuit. The second frequency converter 70 then converts the assigned transmission frequency back to the intermediate frequency (e.g., as stored by the PLL architecture). The downlink frequency filter 74 filters the downlink signal so that the signal passes the downlink filter 74 if the intermediate frequency is the predetermined frequency. The second RF power detector 68 measures power from the downlink signal. The first frequency converter 64 converts the intermediate frequency to the same mobile frequency received from the mobile radio 22 as the previously transmitted uplink signal (e.g., as stored by the PLL architecture). The first switch 62 then directs the downlink signal to the mobile radio 22 so that the mobile radio 22 receives the communication.

Figure 4:
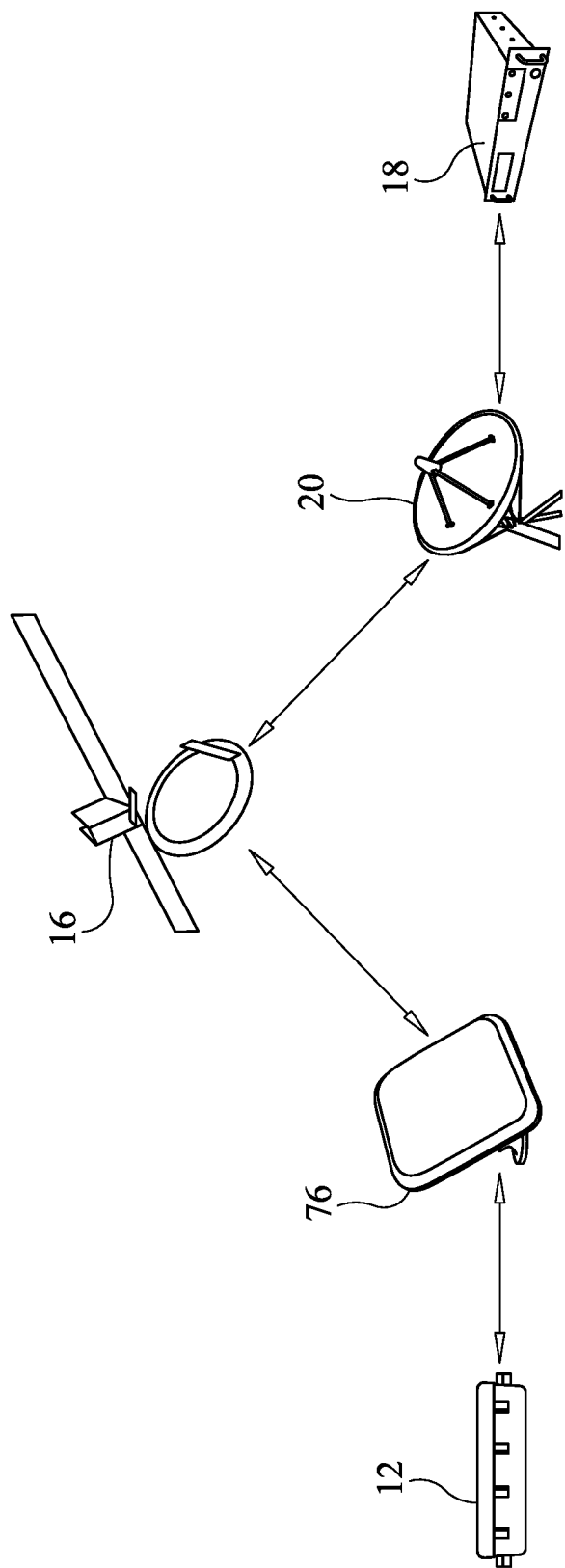
FIG. 4 illustrates an example embodiment of a mobile tactical device being placed in communication with a network operation center to set up talk groups in accordance with the present disclosure.
Figure 6:
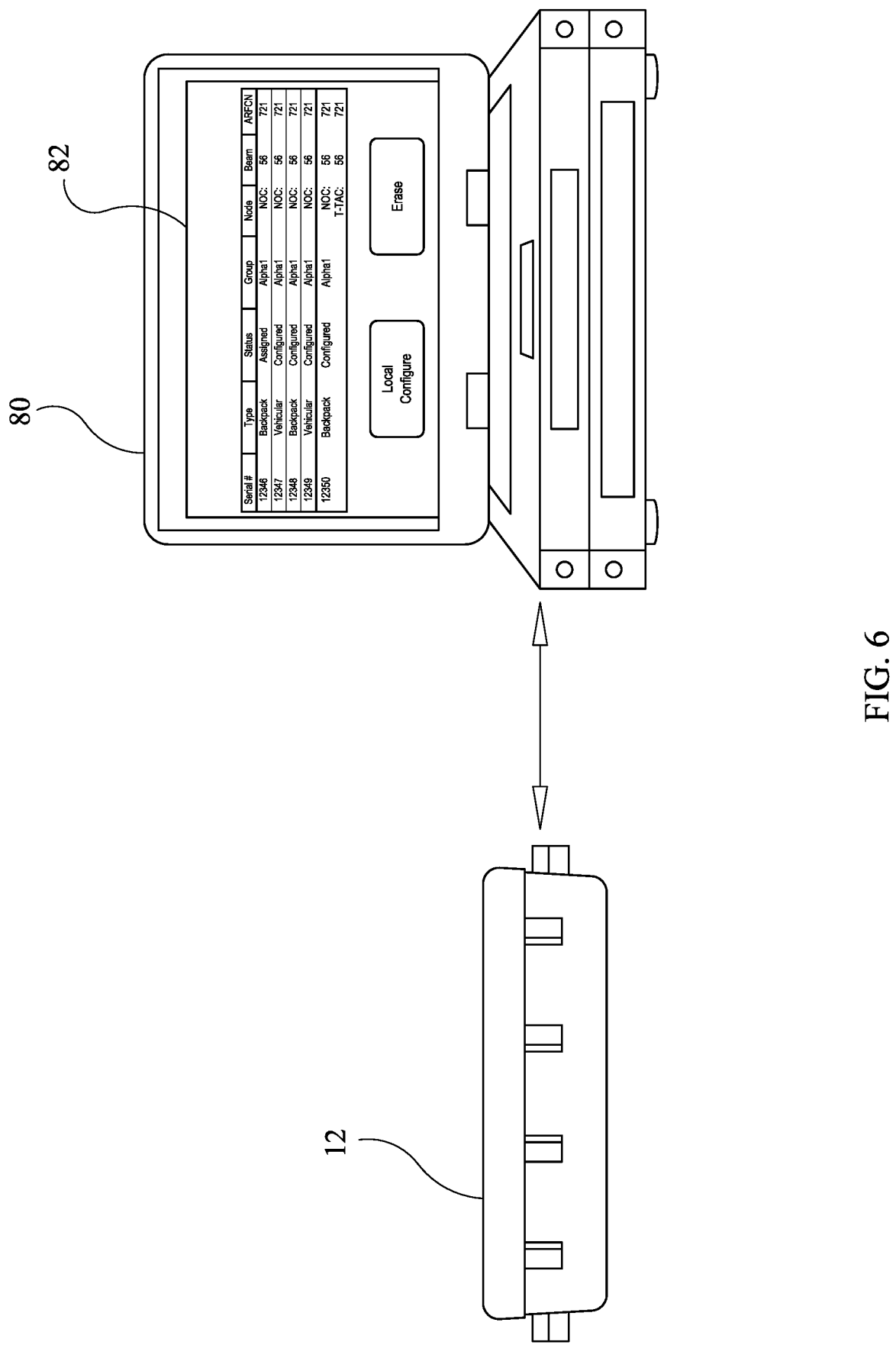
FIG. 6 illustrates an example embodiment of a mobile tactical device being placed in communication with a local computer to set up talk groups in accordance with the present disclosure.
Figure 7:
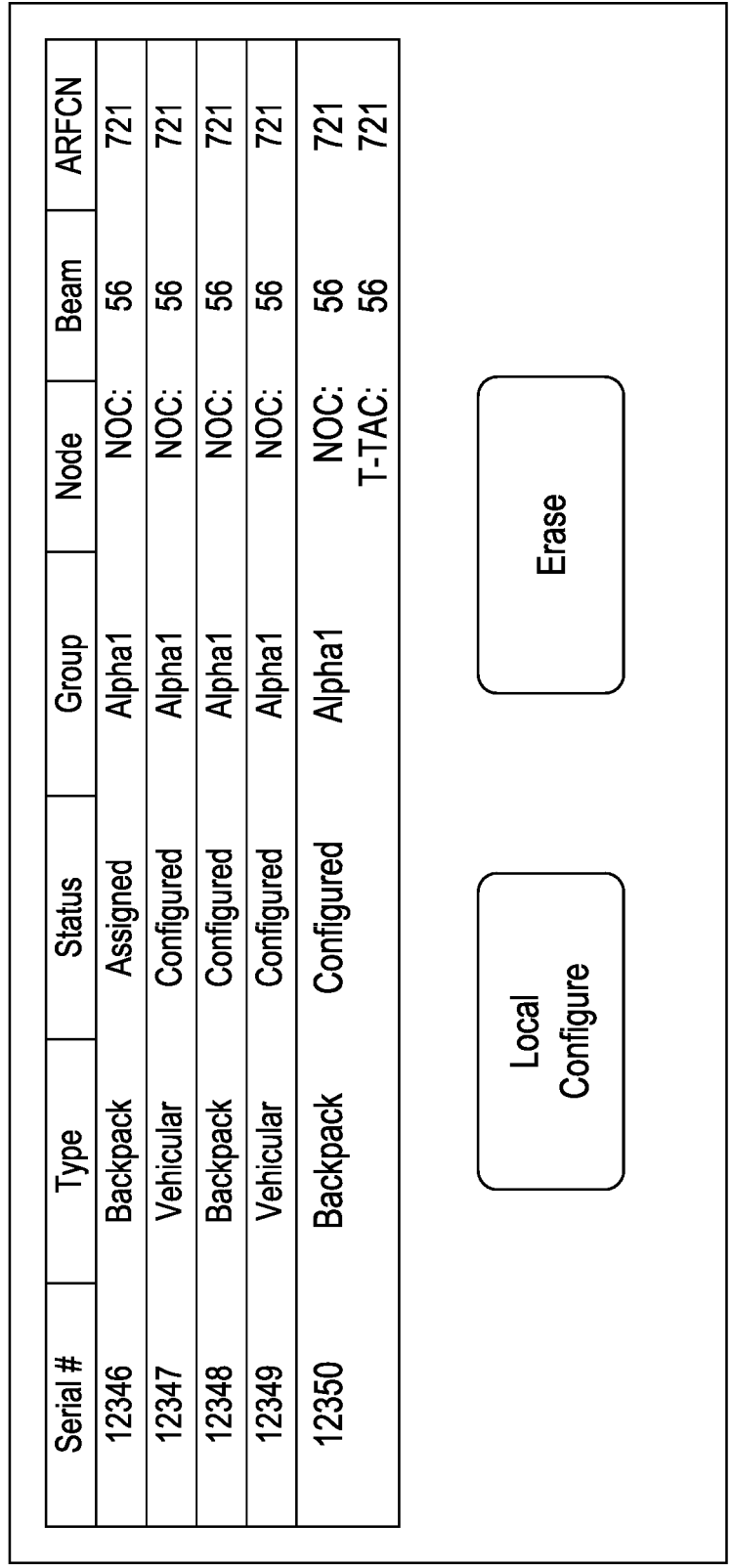
FIG. 7 illustrates an example embodiment of a user interface of a local computer which can be used to set up talk groups with other mobile tactical devices in accordance with the present disclosure.
Figure 9:
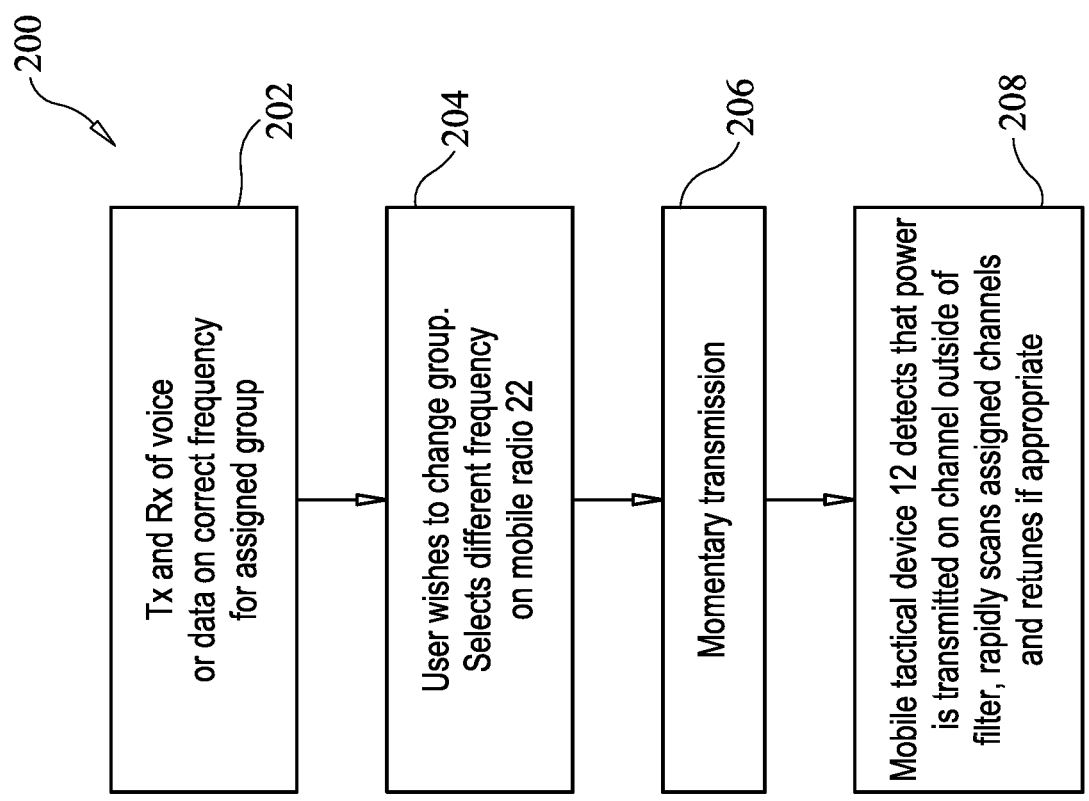
FIG. 9 illustrates an example embodiment of a method of reconfiguring a radio unit for communication with new talk group after configuring the radio unit for an initial talk group.

The mobile tactical device 12 is configured to enable talk groups to be set up remotely and/or by a user in the field. FIGS. 4 and 5 illustrate an example embodiment of the mobile tactical device 12 being set up remotely by the network operation center 18. FIGS. 6 and 7 illustrate an example embodiment of the mobile tactical device 12 being set up by a user in the field.

Referring first to FIGS. 4 and 5, the mobile tactical device 12 is configured to enable the talk groups to be set up remotely by the network operation center 18. The mobile tactical device 12 is configured to be set up by the network operation center 18 without the user of the mobile tactical device 12 having a computer in the field, FIG. 4 illustrates an example embodiment of the mobile tactical device 12 being placed in communication with the network operation center 18 to set up talk groups in accordance with the present disclosure. In the illustrated embodiment, the mobile tactical device 12 is operatively connected to an antenna 24 (e.g., here, a satellite internet modem 76) that is configured to communicate with the satellite 16. The satellite 16 communicates with the network operation center 18, for example, via the gateway 20. Thus, the mobile tactical device 12 is placed in communication with the network operation center 18 by one or more of the satellite 16, the antenna 24/satellite internet modem 76, and; or the gateway 20. In an embodiment, the light 46 (e.g., LED) will illuminate to signal to the user when the mobile tactical device 12 is synced with the network operation center 18. In an embodiment, the mobile tactical device 12 is configured to automatically sync with the network operation center 18 any time a connection can be established between the mobile tactical device 12 and the network operation center 18, thus ensuring that the mobile tactical device 12 is always programmed with current talk group parameters.

FIG. 5 illustrates a user interface 78 at the network operation center 18 which can be used to configure one or more mobile tactical device 12. More specifically, FIG. 5 illustrates a user interface 78 at the network operation center 18 to assign talk groups for multiple mobile tactical devices 12. It should be understood by those of ordinary skill in the art from this disclosure that a user interface 78 at the network operation center 18 can be configured differently and/or include more or less information than that shown in FIG. 5.

The "Serial Numbers" in FIG. 5 indicate the mobile tactical devices 12 that can be configured by the network operation center 18 in accordance with the present disclosure. For example, a first serial number corresponds to the mobile tactical unit 12 of the first radio unit 14a in FIG. 1, a second serial number corresponds to the mobile tactical unit 12 of the second radio unit 14b in FIG. 1, etc. In this way, the network operation center 18 can track and configure all of the mobile tactical units 12 within a group and/or within multiple groups.

The "Type" in FIG. 5 indicates to the current use of each mobile tactical device 12. As discussed above, the mobile tactical device 12 is configured for multiple uses such as backpack, vehicular, maritime, or aero uses and the type of antenna and/or other components may var, depending on the use. The system 10 of the present disclosure enables these different types of uses to be combined into the same talk groups.

The "Status" in FIG. 5 indicates the configuration status of each mobile tactical device 12. "Unassigned" means that the mobile tactical device 12 is not currently assigned to a talk group. Thus, the unassigned mobile tactical devices 12 in FIG. 5 do not have a talk group, beam, SAT channel or radio channel. "Assigned" means that the mobile tactical device 12 has been assigned to a talk group but is not yet configured as discussed herein. "Configured" means that the mobile tactical device 12 has been configured and is now enabled to receive communications based on the assigned talk group parameters. In an embodiment, the mobile tactical device 12 is configured after a momentary transmission is sent as discussed herein.

The "User Group" in FIG. 5 indicates the user (e.g., customer) of each mobile tactical device 12. In an embodiment, the system 10 is controlled by an entity with multiple customers, and the network operation center 18 enables that entity to configure multiple groups for multiple customers without overlapping the groups. In an embodiment, however, the system 10 enables different customers to communicate with each other by having mobile tactical devices 12 in the same talk groups.

The "Talk Group" in FIG. 5 indicates the talk groups that are configured for the same frequency. As discussed herein, when a user sends a radio message to a talk group, the radio message is transmitted to all of the users that are configured for that talk group.

The "Beam", "SAT Channel", and "Radio Channel" in FIG. 5 indicate various transmission parameters for each mobile tactical device 12. As discussed herein, each mobile tactical device 12 converts a mobile frequency to a transmission frequency, and vice versa, to enable communications between the radio units 14 and the satellite 16. The "Beam" indicates the satellite beam currently used by the mobile tactical device 12. The "SAT Channel" indicates the assigned transmission frequency that is assigned to the mobile tactical device 12 for a respective talk group. The "Radio Channel" indicates the assigned mobile frequency that is assigned to the mobile tactical device 12 for a respective talk group. Thus, for a mobile tactical device 12 to communicate with a talk group, the mobile radio 22 used with the mobile tactical device 12 is tuned to the assigned mobile frequency (e.g., "Radio Channel"), and the mobile tactical device 12 then converts the assigned mobile frequency to the assigned transmission frequency (e.g., "SAT Channel") for transmission to the satellite 16. When a communication is received from the satellite 16, the mobile tactical device 12 receives the communication at the assigned transmission frequency (e.g., "SAT Channel") and coverts the assigned transmission frequency to the assigned mobile frequency (e.g., "Radio Channel") tier reception at the mobile radio 22. In an embodiment, the mobile tactical devices 12 in the same talk group use the same assigned mobile frequency, simplifying use for the users of the radio units 14 since each user simply needs to know the assigned mobile frequency for the talk group. In another embodiment, the mobile tactical devices 12 in the same talk group use different local mobile frequencies for different radio units 14.

The "Last Update" and "Comments" in FIG. 4 enable an operator at the network operation center 18 to review updates and/or take/view notes relating to each of the mobile tactical device 12 regardless of the current status. For example, this enables the network operation center 18 to flag certain mobile tactical devices 12 and to determine when the last secure connection was made.

As illustrated in FIG. 5, a mobile tactical device 12 can be configured for multiple talk groups. The controller 30 stores the assigned mobile frequency and the corresponding assigned transmission frequency for each talk group. For example, in FIG. 5, the mobile tactical device 12 having Serial No. 12347 is configured for three different talk groups (Alpha2, Airwing and Charlie 9). When the user of this mobile tactical device 12 wishes to speak with a first talk group (e.g., Alpha1 in FIG. 5), the user adjusts the mobile radio to a first mobile frequency (e.g., 156.05 in FIG. 5) and send a momentary transmission using the first mobile frequency. When the user of this mobile tactical device 12 wishes to speak with a second talk group (e.g., Airwing in FIG. 5), the user adjusts the mobile radio to a second mobile frequency (e.g., 162.475 in FIG. 5) and send a momentary transmission using the second mobile frequency. When the user of this mobile tactical device 12 wishes to speak with a third talk group (e.g., Charlie9 in FIG. 5), the user adjusts the mobile radio to a third mobile frequency (e.g., 149.0375 in FIG. 5) and send a momentary transmission over the third mobile frequency. Thus, the user simply needs to select the assigned mobile frequency and send a momentary transmission to configure the mobile tactical device 12 to send and receive communications with the talk group using the assigned mobile frequency.

Thus, in an embodiment, the network operation center 18 is configured to set up a talk group including a first mobile tactical device 12 and a plurality of second mobile tactical devices 12 all configured to communicate with one or more satellite 16 using one or more transmission frequency. The network operation center 18 is configured to assign the first mobile tactical device 12 to a talk group including the plurality of second mobile tactical devices 12. The network operation center 18 assigns the first mobile tactical device 12 an assigned mobile frequency and an assigned transmission frequency for communications with the plurality of second mobile tactical devices 12 in the talk group. Once set up, the first mobile tactical device 12 is configured to receive a first communication having the assigned mobile frequency from a mobile radio 22 and transmit the first communication to the plurality of second mobile tactical devices 12 after converting the assigned mobile frequency to the assigned transmission frequency. The first mobile tactical device 12 is also configured to receive a second communication having the assigned transmission frequency and transmit the second communication to the mobile radio 22 after converting the assigned transmission frequency to the assigned mobile frequency. The network operation center 18 is configured to remotely assign the assigned mobile frequency and the assigned transmission frequency to the first mobile tactical device 12 via communication over the at least one satellite 16. As discussed below, the network operation center 18 is also configured to locally assign the assigned mobile frequency and the assigned transmission frequency to the first mobile tactical device 12 via a local computer 80.

Referring now to FIGS. 6 and 7, the mobile tactical device 12 is also configured to be set up on site, for example, by connecting to a computer 80. FIG. 6 illustrates an example embodiment of the mobile tactical device 12 being placed in communication with a computer 80 having a user interface 82. In the illustrated embodiment, the computer 80 is operatively connected to the mobile tactical device 12 via the control connection interface 32. The computer 80 enables the local user to manually configure the mobile tactical device 12. In all embodiment, a configuration file can be loaded from the computer 80 into the mobile tactical device 12 to enable quick and simple programming.

FIG. 7 illustrates the user interface 82 of the computer 80 in more detail. More specifically, FIG. 7 illustrates the user interface 82 of the computer 80 as configured to set up talk groups with other mobile tactical devices 12. It should be understood by those of ordinary skill in the art from this disclosure that the user interface 82 can be configured differently and/or include more or less information than that shown in FIG. 7.

In FIG. 7, Serial Number 12350 is the mobile tactical device 12 currently being configured for the Alpha1 talk group, and the user interface 82 lists each of the other mobile tactical devices 12 in the Alpha1 talk group. The user interface 82 further shows the Type, Status, Group, Node, Beam and Absolute Radio-Frequency Channel Number (ARFCN) for each of the mobile tactical devices 12 in the Alpha1, talk group. The ARFCN corresponds to the SAT Channel in FIG. 5. A user is enabled to use the user interface 82, for example, to program the local mobile tactical device 12 to communicate with the talk group. In an embodiment, the user can determine the local mobile frequencies available to the mobile radio 22 and program the local mobile tactical device 12 to use one of those mobile frequencies as an assigned mobile frequency to communicate with a respective talk group. Thus, the user can locally configure an available mobile frequency as an assigned mobile frequency for that mobile tactical device 12. The mobile tactical device 12 and/or computer 80 can further determine available transmission frequencies and beams from the current location and assign an available transmission frequency as the assigned transmission frequency for that talk group and mobile tactical device 12. The user then sends a momentary transmission using the assigned mobile frequency to finish configuring the mobile tactical device 12 for the talk group.

In FIG. 7, the mobile tactical device 12 (Serial No. 12350) is only configured for the Alpha1 talk group. However, in an embodiment, the mobile tactical device 12 can be configured for multiple talk groups, for example, the Alpha1 talk group and also another talk group (e.g., Airwing, Charlie 9, etc. in FIG. 5).

Figure 8:
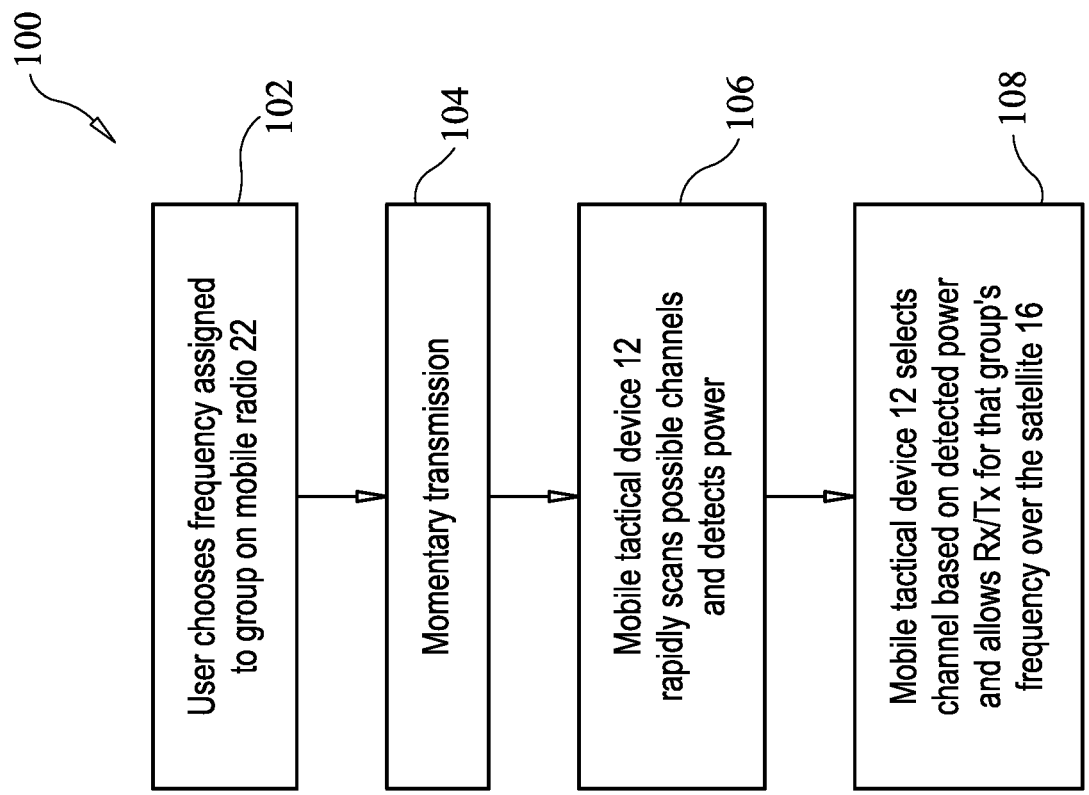
FIG. 8 illustrates an example embodiment of a method of configuring a radio unit for communication with a talk group.

FIG. 8 illustrates an example embodiment of a method 100 of configuring a radio unit 14 for communication with a talk group. Certain steps of the method 100 can be executed by the controller 30, for example, by being stored as instructions on its memory and executed by its processor. It should be understood that some of the steps described herein can be reordered or omitted without departing from the spirit or scope of the method 100.

In method 100, the mobile tactical device 12 has been assigned to at least one talk group. The mobile tactical device 12 can be assigned to multiple talk groups. The controller 30 of the mobile tactical device 12 is thus programmed with an assigned mobile frequency and an assigned transmission frequency fir each talk group. The controller 30 is therefore configured to convert each of the assigned mobile frequencies to the intermediate frequency allowed by the uplink frequency filter 66, for example, by making an appropriate down conversion using conversion parameters that would cause the assigned mobile frequency to be converted to the intermediate frequency that passes the uplink frequency filter 66, Thus, if the intermediate frequency does not pass the uplink frequency filter 66, then the mobile frequency is not the assigned mobile frequency corresponding to that conversion.

At step 102, the user of a mobile tactical device 12 selects a frequency using the mobile radio 22 of the respective radio unit 14. More specifically, the user chooses the assigned mobile frequency for the talk group that the user wishes to communicate with.

At step 104, the user sends a momentary transmission from the mobile radio 22 to the mobile tactical device 12 of the respective radio unit 14. More specifically the user sends the momentary transmission using the assigned mobile frequency. The mobile tactical device 12 further stores the mobile frequency of the momentary transmission as discussed above with respect to the PLL architecture shown in FIG. 3.

At step 106, the mobile tactical device 12 receives and processes the momentary transmission from the mobile radio 22. More specifically, the first frequency converter 64 converts the mobile frequency assuming that the mobile frequency is a first assigned mobile frequency (e.g., for a first talk group). The mobile tactical device 12 then compares power at the first RF power detector 60 and the second RF power detector 68. When the first RF power detector 60 has measured power but the second RF power detector 68 has not, this indicates that the mobile frequency chosen by the user is not the first assigned mobile frequency because the uplink signal has not passed through the uplink frequency filter 66. The first frequency converter 64 would then convert the mobile frequency assuming that the mobile frequency is a second assigned mobile frequency. As discussed above, the uplink frequency filter 66 is configured to prevent transmission of the momentary transmission if the momentary transmission is not an assigned mobile frequency, Thus, if no signal passes through the uplink frequency filter 66 after the controller 30 has converted the mobile frequency using appropriate conversions for each of the assigned mobile frequencies for that mobile tactical device 12, then the user has not chosen an assigned mobile frequency. When the first RF power detector 60 and the second RF power detector 68 have both measured power, this indicates that the mobile radio 22 is tuned to an assigned mobile frequency and the controller 30 has recognized that assigned mobile frequency.

At step 108, if the momentary transmission is determined to have an assigned mobile frequency, the mobile tactical device 12 is then configured for the intended talk group. More specifically, the mobile tactical device 12 converts the intermediate frequency for the momentary transmission to the corresponding assigned transmission frequency at the second frequency converter 70. The mobile tactical device 12 also stores the conversions made at the first frequency converter 64 and/or the second frequency converter 70, such that the same reverse conversions are made when a communication is received by the mobile tactical device 12 from the satellite 16 using the assigned transmission frequency. More specifically, the mobile tactical device 12 sets the second frequency converter 70 such that an additional communication received using the assigned transmission frequency is converted to the intermediate frequency. The intermediate frequency is then converted to the assigned mobile frequency at the first frequency converter 64. The mobile tactical device 12 has therefore now enabled the mobile radio 22 to send and receive communications with other members of the talk group as long as the user keeps the mobile radio 22 tuned to the same assigned mobile frequency.

FIG. 8 illustrates an example embodiment of a method 100 of configuring a radio unit 14 for communication with a new talk group after being configured for a previous talk group. Thus, in an embodiment, the method 200 follows the method 100 when a mobile tactical device 12 is used for multiple talk groups. Certain steps of the method 200 can be executed by the controller 30, for example, by being stored as instructions on its memory and executed by its processor. It should be understood that some of the steps described herein can be reordered or omitted without departing from the spirit or scope of the method 100.

At step 202, the user sends and receives communications with a first talk group using a first mobile frequency on a mobile radio 22 of a respective radio unit 14. Step 202 is performed, for example, after the user has enabled the first talk group using the method 100.

At step 204, the user wishes to change to a second talk group. The user of the mobile tactical device 12 selects a different mobile frequency using the mobile radio 22 of the respective radio unit 14, More specifically, the user chooses another assigned mobile frequency corresponding to the second talk group that the user wishes to communicate with.

At step 206, the user sends a second momentary transmission from the mobile radio 22 to the mobile tactical device 12 of the respective radio unit 14. More specifically the user sends the second momentary transmission using the second assigned mobile frequency. The mobile tactical device 12 further stores the second mobile frequency of the second momentary transmission as discussed above with respect to the PLL architecture shown in FIG. 3.

At step 208, the mobile tactical device 12 receives/processes the momentary transmission as described above. More specifically, the mobile tactical device 12 compares power at the first RF power detector 60 and the second RF power detector 68. When the first RF power detector 60 has measured power but the second RF power detector 68 has not, this indicates that the mobile radio 22 is not tuned to an assigned mobile frequency and the uplink signal has not passed through the uplink frequency filter 66. When the first RF power detector 60 and the second RF power detector 68 have both measured power, this indicates that the mobile radio 22 is tuned to an assigned mobile frequency and the uplink signal has passed through the uplink frequency filter 66. If the second momentary transmission is determined to have an assigned mobile frequency, the mobile tactical device 12 is then configured for the second talk group. More specifically, the mobile tactical device 12 converts the second mobile frequency for the second momentary transmission to the assigned transmission frequency for the second talk group as described herein. The mobile tactical device 12 also stores the conversions made at the first frequency converter 64 and/or the second frequency converter 70, such that the same reverse conversions are made when a communication is received by the mobile tactical device 12 from the satellite 16 using the second assigned transmission frequency. The mobile tactical device 12 has therefore now enabled the mobile radio 22 to send and receive communications with other members of the second talk group as long as the user keeps the mobile radio 22 tuned to the second assigned mobile frequency. The user may thereafter switch to other talk groups using the same method 200.

The embodiments described herein provide improved systems and methods for enabling over-the-horizon systems for radio communications between a plurality of users of a talk group. These systems and methods are advantageous, for example, because they enable group communications to and from one user to a plurality of other users using the same mobile frequency based on the initial user selecting that frequency at the user's mobile radio 22. It should be understood that various changes and modifications to the systems and methods described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A mobile tactical device for enabling radio communications between a plurality of users, the mobile tactical device comprising:

a radio connection interface configured to receive a first communication having a mobile frequency from a mobile radio;

a first power detector configured to detect power related to the first communication;

a first frequency converter configured to convert the mobile frequency to an intermediate frequency after detection by the first power detector;

a frequency filter configured to pass the intermediate frequency when the mobile frequency is an assigned mobile frequency corresponding to one of a plurality of predetermined frequencies for talk groups and reject the intermediate frequency when the mobile frequency is not the assigned mobile frequency corresponding to one of the plurality of predetermined frequencies for talk groups;

a second power detector configured to detect power related to the first communication after the first communication has passed the frequency filter; and a second frequency converter configured to convert the intermediate frequency to an assigned transmission frequency for transmission of the first communication.

2. The mobile tactical device of claim 1, wherein
the mobile frequency is in a VHF or UHF frequency range, and
the assigned transmission frequency is in an L-band or S-band frequency range.

3. The mobile tactical device of claim 1, wherein
the second frequency converter is configured to convert the intermediate frequency to the assigned transmission frequency for transmission of the first communication to a satellite, a high altitude platform station or another intermediate communication device.

4. The mobile tactical device of claim 1, comprising
a controller configured to store a plurality of assigned mobile frequencies and corresponding assigned transmission frequencies for a plurality of talk groups and control the first frequency converter and the second frequency converter so that each assigned mobile frequency is converted to a corresponding assigned transmission frequency for transmission to a respective talk group.

5. The mobile tactical device of claim 1, wherein
at least one of the first frequency converter and the second frequency converter includes a phase-locked loop frequency converter.

6. The mobile tactical device of claim 1, wherein
the first frequency converter is configured to convert the mobile frequency to the intermediate frequency using one or more conversion parameters that assume that the mobile frequency is at least one of the plurality of predetermined frequencies for the talk groups.

7. The mobile tactical device of claim 1, wherein
the first frequency converter is configured to cycle through a plurality of conversions based on the plurality of predetermined frequencies until one of the plurality of conversions results in the second power detector detecting power related to the first communication.

8. The mobile tactical device of claim 1, wherein
after detection by the second power detector, the second frequency converter is further set such that a second communication received using the assigned transmission frequency is converted to the assigned mobile frequency for transmission to the mobile radio.

9. A mobile tactical device for enabling radio communications between a plurality of users, the mobile tactical device comprising:

a radio connection interface configured to receive a first communication;
a first power detector configured to detect power related to the first communication;
a frequency filter configured to pass or reject the first communication after the first communication has been detected by the first power detector based on a frequency of the first communication being an assigned mobile frequency predetermined for a talk group;
a second power detector configured to detect power related to the first communication after the first communication has passed the frequency filter; and
a controller configured to cause the first communication to be converted to an assigned transmission frequency corresponding to the assigned mobile frequency upon determining that the first communication has been detected by both the first power detector and the second power detector.

10. The mobile tactical device of claim 9, comprising
a first frequency converter configured to convert the assigned mobile frequency of the first communication to an intermediate frequency, and
a second frequency converter configured to convert the intermediate frequency to the assigned transmission frequency.

11. The mobile tactical device of claim 10, wherein
at least one of the first frequency converter and the second frequency converter includes a phase-locked loop frequency converter.

12. The mobile tactical device of claim 9, wherein
the controller is configured to store a plurality of assigned mobile frequencies and a plurality of assigned transmission frequencies and cause conversion to one of the plurality of assigned transmission frequencies upon determining that the first communication has been detected by both the first power detector and the second power detector.

13. The mobile tactical device of claim 9, wherein
the assigned mobile frequency is in a VHF or UHF frequency range, and
the assigned transmission frequency is in an L-band or S-band frequency range.

14. The mobile tactical device of claim 9, wherein
the controller is configured to cause a second communication having the assigned transmission frequency to be converted to the assigned mobile frequency for transmission to a mobile radio via the radio connection interface.

15. The mobile tactical device of claim 9, comprising
at least one frequency converter configured to convert the first communication to different frequencies, the at least one frequency converter configured to cycle through a plurality of conversions until one of the plurality of conversions results in the second power detector detecting power related to the first communication.

16. The mobile tactical device of claim 15, wherein
after detection of the first communication by the second power detector, the controller is configured to set the at least one frequency converter such that a second communication received using the assigned transmission frequency is converted to the assigned mobile frequency for transmission to a mobile radio.

17. A method of enabling radio communications between a plurality of users, the method comprising:
receiving a momentary transmission from a mobile radio, the momentary transmission having an assigned mobile frequency corresponding to a talk group;
detecting power related to the momentary transmission having the assigned mobile frequency;
converting the assigned mobile frequency to an intermediate frequency using at least one frequency converter;
detecting power related to the momentary transmission after conversion to the intermediate frequency;
converting the intermediate frequency to an assigned transmission frequency using the at least one frequency converter; and
setting the at least one frequency converter such that a communication received using the assigned transmission frequency is converted to the assigned mobile frequency for transmission to the mobile radio.

18. The method of claim 17, comprising
receiving a second momentary transmission from the mobile radio, the second momentary transmission having a different assigned mobile frequency corresponding to a different talk group,
converting the different assigned mobile frequency of the second momentary transmission to a second assigned transmission frequency using the at least one frequency converter; and
setting the at least one frequency converter such that a second communication received using the second assigned transmission frequency is converted to the different assigned mobile frequency for transmission to the mobile radio.

19. The method of claim 17, comprising
preventing transmission of the momentary transmission when the momentary transmission does not have one or more assigned mobile frequencies corresponding to one or more talk groups.

20. The method of claim 19, comprising
filtering the intermediate frequency to prevent transmission of the momentary transmission when the momentary transmission is not received with the assigned mobile frequency.

* * * * *